B. W. SMITH.
COMBINED AIR PUMP AND CUSHION.
APPLICATION FILED FEB. 3, 1910.
998,128.
Patented July 18, 1911.
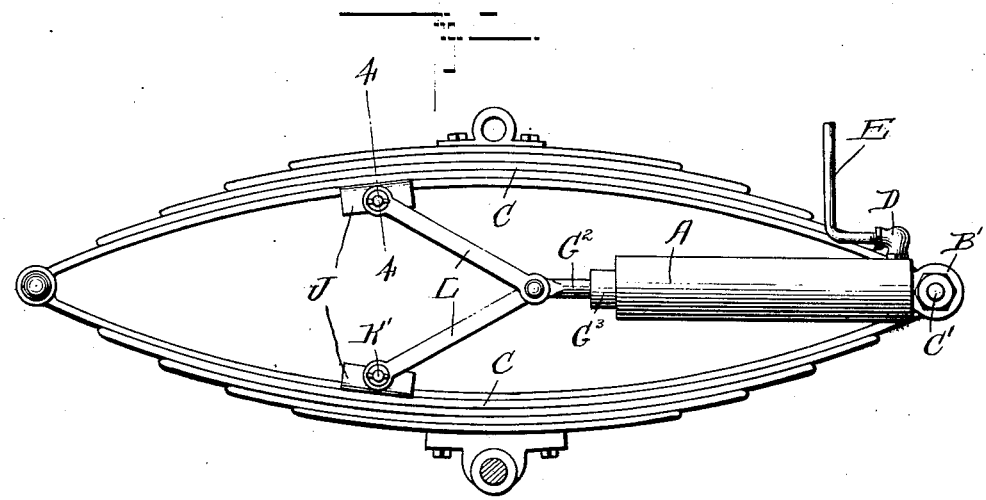
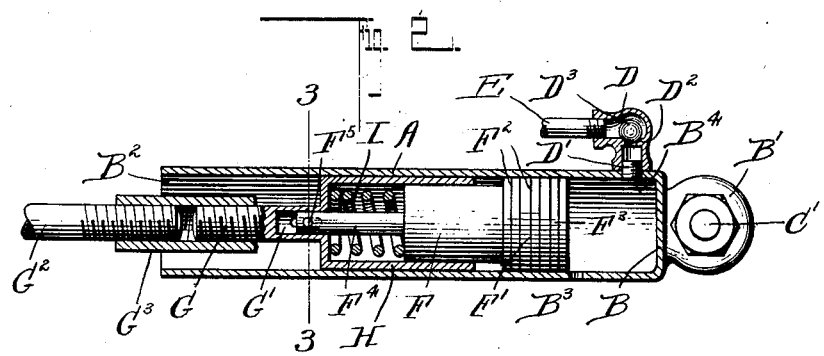
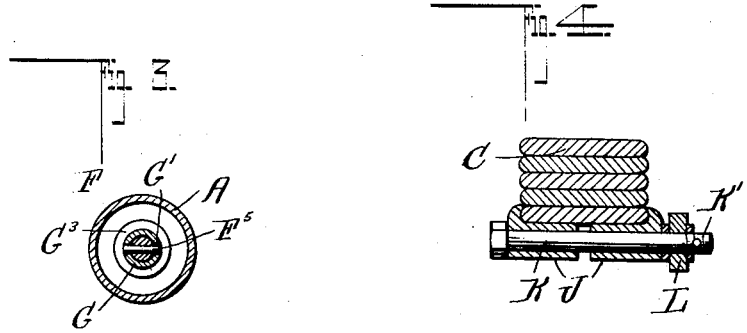
Witnesses
Philip H. Burch
Inventor
B. W. Smith,
By Chas. E. Brock
Attorneys

UNITED STATES PATENT OFFICE.

BENJAMIN W. SMITH, OF MONTPELIER, INDIANA, ASSIGNOR OF ONE-HALF TO THOMAS C. NEAL, OF MONTPELIER, INDIANA.

COMBINED AIR PUMP AND CUSHION.

998,128.

Specification of Letters Patent. Patented July 18, 1911.

Application filed February 3, 1910. Serial No. 541,795.

*To all whom it may concern:*

Be it known that I, BENJAMIN W. SMITH, a citizen of the United States, residing at Montpelier, in the county of Blackford and State of Indiana, have invented a new and useful Improvement in Combined Air Pumps and Cushions, of which the following is a specification.

This invention relates to a combined air pump and cushion especially adapted to be used in connection with motor vehicles for compressing air in a storage tank, forming a cushion for the springs of the same whereby the shock will be absorbed and at the same time air compressed.

Another object of my invention is to provide a device which can be easily and quickly attached to the ordinary elliptical springs used on motor vehicles for supporting the body whereby the shock on the springs caused by traveling over rough roads will be absorbed by the device in such a manner that air will be compressed at the same time in a storage tank which can be used for blowing up the tires and the like.

A still further object of my invention is to provide a device which is so connected to the elliptical spring that the same will be out of the way so that all danger of the same becoming broken is prevented.

Another object of my invention is to provide a device in which the compression of the springs operates a piston within a pump so as to compress a certain amount of air which is forced into a storage tank.

A still further object of the invention is to provide means for allowing the piston rod to move slightly before the piston is operated so that when the springs are compressed only slightly the shock will be absorbed by a coil spring carried by the piston.

Another object of my invention is to provide a combined air pump and air cushion in which a pair of levers are employed which are connected to the respective spring sections of an elliptical spring in such a manner that when the springs are compressed the piston will be forced forwardly into an air or pump chamber and when expanded will be drawn outwardly.

With these various objects in view, my invention consists in the novel features of construction, combination and arrangement of parts hereinafter fully described and pointed out in the claims.

In the drawings forming a part of this specification: Figure 1 is a side elevation of my improved air pump and air cushion showing the same attached to an elliptical spring used in connection with a motor vehicle. Fig. 2 is a longitudinal vertical section. Fig. 3 is a transverse section taken on the line 3—3 of Fig. 2, and Fig. 4 is a section taken on the line 4—4 of Fig. 1.

In carrying out my improved invention, I employ a pump cylinder A which is provided with a closed end B having an apertured ear B' extending therefrom which is adapted to be mounted on the connecting bolt C' of an elliptic spring C which may be of any of the ordinary constructions of springs now in use in connection with motor vehicles, and the like. The cylinder is provided with an open end $B^2$ and has an air inlet $B^3$ formed in its side through which air is adapted to pass so that when the piston compressing the air passes said air inlet it will be closed in order that the air in the end of the cylinder can be compressed and forced outwardly as will be hereinafter fully described. A threaded bore $B^4$ is formed in the side of the cylinder adjacent its closed end in which is secured the nipple D' of a valve casing D and is provided with a valve seat $D^2$ in which is mounted a ball valve $D^3$ forming a check valve so that the pressure of air will raise the ball valve off of the seat and allow the air to pass through the valve casing. Connected to the valve casing is a pipe E which leads to a suitable storage tank, not shown, in which the air compressed by the pump is adapted to be stored to be used for inflating tires and the like on motor vehicles.

Slidably mounted within the pump cylinder A is a piston F which is provided with an enlarged head portion F' having a series of annular grooves $F^2$ in which are mounted piston rings $F^3$ for forming a tight joint around the head so that when the piston is forced forwardly the air which has entered through the inlet $B^3$ will be compressed in the end of the cylinder and forced outwardly through the check valve into a storage tank. The piston F is provided with a stem portion $F^4$ which extends into a bore G' formed in the end of a piston rod G, said rod being provided with a longitudinal slot communicating with said bore and through which a pin $F^5$ extends which is carried by the end of the stem F⁴ of the piston F so that the piston rod will have a sliding connection with the piston as will be hereinafter fully described. The piston rod G carries a tubular sleeve member H which telescopes the piston F and fits snugly within the cylinder A, said sleeve member being rigidly connected to the piston rod or formed integral therewith as may be desired. The stem F⁴ of the piston F is surrounded by a coil spring I which forms a cushion so that when the piston rod G is forced forwardly within the cylinder A, the spring will yield in such a manner that the piston will not be operated with a jerk and as the piston is forced forwardly and the pin F⁵ of the stem F⁴ comes into engagement with the ends of the slot the piston will be moved so that an air cushion within the end of the cylinder is formed.

Connected to the inner faces of the upper and lower sections of the elliptical spring are clamping members J which are formed of two sections clamped together by a bolt K which extends transversely through the respective sections and clamps the members securely on the leaves of the springs as clearly shown in the sectional view and said bolt is provided with a collar adjacent one end and has an outwardly projecting stud portion K' on which are pivotally mounted toggle links L which are held in position thereon by nuts or pins as may be desired so that the same can move freely. The free ends of the toggle arms L are pivotally mounted on a pivot pin carried by the outer section G² of the piston rod G, said piston rod being formed of two sections having threaded ends which are connected together by a turn buckle G³ as clearly shown so that the length of the piston rod can be regulated so as to adjust the stroke of the piston. It will be seen that when the elliptical spring is compressed the toggle arms will be forced together so as to force the piston rod G forwardly within the pump cylinder A so as to carry the piston forwardly also in order that air which has entered the cylinder through the inlet B³ will be forced out through the check valve into a suitable storage tank. As the piston rod is moved forwardly by the toggle arms the coil spring yields to such an extent that when the springs are compressed only slightly the piston will not be operated but when the springs are compressed by the vehicle on which they are arranged passing over an exceedingly rough place in the road the piston will be forced forwardly in the pump cylinder to such an extent that an air cushion will be formed in the end of the pump cylinder which will gently be relieved by the air passing out of the same through the check valve into the storage tank.

From the foregoing description, it will be seen that I have provided a combined air pump and air cushion which is especially adapted to be used in connection with a spring used on automobiles and the like, but it is of course understood that the device can be attached to various other places.

It will also be seen that the device when attached to an automobile will prevent the springs from becoming broken as when the springs are compressed an air cushion is formed by the piston in such a manner that when the weight is taken off of the springs they will return to their normal positions slowly.

Having thus fully described my invention, what I claim as new and desire to secure by Letters Patent, is:

1. In a device of the kind described, the combination with a spring, of a pump cylinder connected to the pivot point of said spring; a piston mounted in said cylinder; a piston rod connected with said piston, and toggle arms connected to said spring having a loose connection to said piston rod.

2. In a device of the kind described, the combination with an elliptic spring, of a pump cylinder pivotally connected to the connecting bolt of said spring, a piston mounted in said pump cylinder provided with a stem, a piston rod provided with a bore slidably mounted over said stem, said piston rod being provided with a slot communicating with said bore, the pin carried by said stem extending through said slot, a sleeve carried by said piston rod extending over said piston, a spring surrounding said stem, and toggle arms pivotally connected to the sections of said spring having their free ends connected to said piston rod.

3. In a device of the kind described, the combination with an elliptic spring, of a pump cylinder carried by said spring, a check valve connected to said cylinder, a pipe connected to said check valve, a piston mounted within said cylinder, a sectional piston rod slidably connected to said piston, clamping members secured to the sections of said spring and toggle arms pivotally mounted on said clamping members having their ends connected to said piston rod.

4. In a device of the kind described, the combination with an elliptic spring, of a cylinder carried by said spring, a piston working in said cylinder, a piston rod having a sliding connection with said piston, a spring cushion arranged between said piston and piston rod, and toggle arms connected to the respective spring sections of said spring having their ends connected to said piston rod.

5. In a device of the kind described, the combination with an elliptical spring, of a pump casing provided with an air inlet and having an apertured ear at its closed end adapted to be pivotally connected to the connecting bolt of said spring, a piston slidably mounted within said pump cylinder provided with a head and having a stem, a sectional piston rod provided with a bore at one end adapted to receive said stem, said piston rod being provided with a slot communicating with said bore, a pin carried by said stem extending through said slot, a sleeve member carried by said piston rod telescoping said piston, a spring surrounding said stem within said sleeve member, sectional clamping members secured to the respective spring sections of said spring provided with stud bolts, toggle arms pivotally mounted upon said stud bolts said toggle arms being pivotally connected to said piston rod.

6. A combined air pump and air cushion comprising a pump cylinder adapted to be connected to an elliptical spring, said casing being provided with a check valve having a pipe connected thereto for conveying air to a storage tank, a piston slidably mounted within said pump casing, a piston rod slidably connected to said piston, a spring cushion arranged between said piston rod and piston, sectional clamping members secured to the spring sections of said spring by transverse bolts having stud ends, and toggle arms pivotally mounted upon said ends having their free ends connected to the outer end of said piston rod.

7. In a device of the kind described, the combination with an elliptical spring, of a pump cylinder pivotally carried by said spring, a piston mounted within said pump cylinder, a piston rod having a sliding connection with said piston, clamping members connected to the respective sections of said elliptical spring and toggle arms pivotally connected to said clamping members having their free ends pivotally connected to said piston rod.

BENJ. W. SMITH.

Witnesses:
   Thos. C. Neal,
   M. O. Bebout.